(12) United States Patent
Yu et al.

(10) Patent No.: US 12,478,241 B2
(45) Date of Patent: Nov. 25, 2025

(54) CONTROL METHOD FOR SELF-MOVING DEVICE AND SELF-MOVING DEVICE

(71) Applicant: DREAME INNOVATION TECHNOLOGY (SUZHOU) CO., LTD., Suzhou (CN)

(72) Inventors: Shunchang Yu, Suzhou (CN); Zhen Wang, Suzhou (CN); Shenghao Tang, Suzhou (CN)

(73) Assignee: DREAME INNOVATION TECHNOLOGY (SUZHOU) CO., LTD., Suzhou (CN)

( * ) Notice: Subject to any disclaimer, the term of this patent is extended or adjusted under 35 U.S.C. 154(b) by 416 days.

(21) Appl. No.: 18/015,719

(22) PCT Filed: Jul. 12, 2021

(86) PCT No.: PCT/CN2021/105792
§ 371 (c)(1),
(2) Date: Jan. 11, 2023

(87) PCT Pub. No.: WO2022/012471
PCT Pub. Date: Jan. 20, 2022

(65) Prior Publication Data
US 2023/0270308 A1 Aug. 31, 2023

(30) Foreign Application Priority Data

Jul. 13, 2020 (CN) .......................... 202010666134.2
Jul. 13, 2020 (CN) .......................... 202010666135.7
Jul. 13, 2020 (CN) .......................... 202010666140.8

(51) Int. Cl.
*A47L 11/40* (2006.01)
*A47L 9/28* (2006.01)
(Continued)

(52) U.S. Cl.
CPC ........ *A47L 11/4011* (2013.01); *G05D 1/0238* (2013.01); *G05D 1/0246* (2013.01);
(Continued)

(58) Field of Classification Search
CPC ............. A47L 11/4011; A47L 2201/04; A47L 2201/06; A47L 9/2826; A47L 11/4061;
(Continued)

(56) References Cited

U.S. PATENT DOCUMENTS

2011/0211731 A1 9/2011 Lee et al.
2012/0265391 A1 10/2012 Letsky
(Continued)

FOREIGN PATENT DOCUMENTS

CN 104825101 A 8/2015
CN 106355151 A 1/2017
(Continued)

OTHER PUBLICATIONS

Seo-Yeon Hwang, Jae-Bok Song, "Monocular Vision-Based SLAM in Indoor Environment Using Corner, Lamp, and Door Features from Upward-Looking camera", IEEE Transactions on Industrial Electronics, Oct. 2011, pp. 4804-4812, vol. 58, Issue No. 10, IEEE.
(Continued)

*Primary Examiner* — Harry Y Oh
(74) *Attorney, Agent, or Firm* — Sughrue Mion, PLLC

(57) ABSTRACT

A control method for a self-moving device, includes: obtaining edge information of a working area where the self-moving device is located; obtaining an environment image captured while moving; obtaining access door information based on the environment image; and dividing independent areas within the working area based on the access door information and the edge information. The self-moving
(Continued)

device includes a movement component, a movement driving component, an image identification component and a control component.

19 Claims, 9 Drawing Sheets

(51) Int. Cl.
    *G05D 1/00*     (2024.01)
    *G06T 7/13*     (2017.01)
    *G06T 7/70*     (2017.01)
    *G06V 10/12*     (2022.01)
    *G06V 10/764*     (2022.01)
    *G06V 10/774*     (2022.01)
    *G06V 10/82*     (2022.01)
    *G06V 10/94*     (2022.01)
    *G06V 20/10*     (2022.01)
    *H04N 23/60*     (2023.01)
    *H04N 23/61*     (2023.01)

(52) U.S. Cl.
    CPC ............ *G06T 7/13* (2017.01); *G06T 7/70* (2017.01); *G06V 10/82* (2022.01); *A47L 2201/04* (2013.01); *A47L 2201/06* (2013.01); *G06T 2207/20081* (2013.01); *G06T 2207/20084* (2013.01); *G06V 2201/07* (2022.01)

(58) Field of Classification Search
    CPC ........... A47L 9/2852; A47L 9/2873; A47L 2201/022; G05D 1/0238; G05D 1/0246; G06T 7/13; G06T 7/70; G06T 2207/20081; G06T 2207/20084; G06V 10/82; G06V 2201/07; G06V 10/955; G06V 10/12; G06V 10/764; G06V 10/774; G06V 20/10; H04N 23/61; H04N 23/60
See application file for complete search history.

(56) References Cited

U.S. PATENT DOCUMENTS

| | | | |
|---|---|---|---|
| 2017/0361468 A1* | 12/2017 | Cheuvront | G06F 3/16 |
| 2018/0210445 A1 | 7/2018 | Choi et al. | |
| 2019/0213438 A1 | 7/2019 | Jones et al. | |
| 2020/0097012 A1 | 3/2020 | Hong et al. | |
| 2020/0122333 A1 | 4/2020 | Park et al. | |
| 2020/0398436 A1* | 12/2020 | Cousins | B25J 11/008 |

FOREIGN PATENT DOCUMENTS

| | | | | |
|---|---|---|---|---|
| CN | 106983449 A | | 7/2017 | |
| CN | 107088883 A | | 8/2017 | |
| CN | 108143364 A | | 6/2018 | |
| CN | 108763606 A | | 11/2018 | |
| CN | 109272554 A | | 1/2019 | |
| CN | 109784194 A | | 5/2019 | |
| CN | 109871420 A | | 6/2019 | |
| CN | 110059558 A | | 7/2019 | |
| CN | 110070005 A | | 7/2019 | |
| CN | 110251004 A | | 9/2019 | |
| CN | 110348318 A | | 10/2019 | |
| CN | 110353583 A | | 10/2019 | |
| CN | 110450152 A | | 11/2019 | |
| CN | 110458082 A | | 11/2019 | |
| CN | 110502019 A | | 11/2019 | |
| CN | 110897567 A | * | 3/2020 | |
| CN | 111012261 A | | 4/2020 | |
| CN | 111150330 A | | 5/2020 | |
| CN | 111166247 A | | 5/2020 | |
| CN | 111539398 A | | 8/2020 | |
| CN | 111539399 A | | 8/2020 | |
| CN | 111539400 A | | 8/2020 | |
| CN | 110458082 B | * | 5/2022 | ........... G06F 18/241 |
| EP | 2407847 A2 | | 1/2012 | |
| EP | 2908204 A1 | | 8/2015 | |
| JP | 2012-11200 A | | 1/2012 | |
| JP | 2018-500633 A | | 1/2018 | |
| JP | 2018-533801 A | | 11/2018 | |
| JP | 2019-121364 A | | 7/2019 | |
| WO | 2020077850 A1 | | 4/2020 | |

OTHER PUBLICATIONS

Haipeng Zhao, Yang Zhou, Long Zhang, Yangzhao Peng, Xiaofei Hu, Haojie Peng, Xinyue Cai, "Mixed YOLOv3-Lite: A Lightweight Real-Time Object Detection Method", Sensors, Mar. 27, 2020, pp. 1-18, vol. 20, Issue 1861, MDPI.

Kai Ning, "Research on Garbage and Driving Area Detection of Sweeping Robot", Information & Technology, China Master Theses, 2020, Issue No. 2, pp. 1-53, Xiangtan University, China.

Haipeng Zhao, Yang Zhou, Long Zhang, Yangzhao Peng, Xiaofei Hu, Haojie Peng, Xinyue Cai; "Mixed YOLOv3-LITE: A Lightweight Real-Time Object Detection Method", Sensors, Mar. 27, 2020, pp. 1-18, vol. 20, Issue No. 1861, MDPI.

* cited by examiner

CONTROL METHOD FOR SELF-MOVING DEVICE AND SELF-MOVING DEVICE

CROSS REFERENCE TO RELATED APPLICATIONS

The present invention is a 35 U.S.C. § 371 National Phase conversion of International (PCT) Patent Application No. PCT/CN2021/105792, filed on Jul. 12, 2021, which claims benefit of Chinese Application No. 202010666135.7, filed on Jul. 13, 2020, Chinese Application No. 202010666140.8, filed on Jul. 13, 2020 and Chinese Application No. 202010666134.2, filed on Jul. 13, 2020, the disclosure of which is incorporated by reference herein. The PCT International Patent Application was filed and published in Chinese.

TECHNICAL FIELD

The present disclosure relates to a control method for a self-moving device and the self-moving device, which belongs to a technical field of computer technology.

BACKGROUND

With the development of artificial intelligence and the robotics industry, smart home appliances such as sweeping robots have gradually become popular.

A common sweeping robot identifies environment pictures through a camera component fixed above a body of the sweeping robot. The sweeping robot adopts image identification algorithms to identify objects in the identified pictures. In order to ensure the accuracy of image identification, the image identification algorithms are usually obtained by training based on neural network models.

However, the existing image identification algorithms require a combination of a graphics processor (Graphics Processing Unit, GPU) and a neural network processor (Neural Processing Unit, NPU) to implement, therefore hardware requirements of the sweeping robots are relatively high.

SUMMARY

The present disclosure provides a self-moving device, a control method, a control device and a storage medium of the self-moving device. The present disclosure is capable of solving the problem that the existing image identification algorithms have high requirements on the hardware of the sweeping robots, which results in a limited application range of the object identification function of the sweeping robots. The present disclosure provides following technical solutions.

A first aspect of the present disclosure provides a control method of a self-moving device, wherein the self-moving device includes an image identification component, the control method including:
  obtaining an environment image identified by the image identification component;
  obtaining an image identification model, computing resources occupied by the image identification model during operation being lower than maximum computing resources provided by the self-moving device; and
  controlling the environment image inputted into the image identification model so as to obtain an object identification result, the object identification result being used to indicate categories of target objects.

Alternatively, the image identification model is obtained by training a small network detection model.

Alternatively, before obtaining the image identification model, the control method further includes:
  obtaining a small network detection model;
  obtaining training data, the training data including training images of each object in a working area of the self-moving device and an identification result of each training image;
  inputting the training images into the small network detection model so as to obtain a model result; and
  training the small network detection model based on a difference between the model result and the identification result corresponding to the training images so as to obtain the image identification model.

Alternatively, after training the small network detection model based on the difference between the model result and the identification result corresponding to the training images so as to obtain the image identification model, the control method further includes:
  processing model compression on the image identification model to obtain the image identification model for object identification.

Alternatively, the small network detection model is a miniature YOLO model or a MobileNet model.

Alternatively, after controlling the environment image inputted into the image identification model so as to obtain the object identification result, the control method further includes:
  controlling the self-moving device to move so as to complete a corresponding task based on the object identification result.

Alternatively, the self-moving device includes a liquid cleaning component; and wherein controlling the self-moving device to move so as to complete the corresponding task based on the object identification result includes:
  when the object identification result indicates that the environment image contains a liquid image, controlling the self-moving device to move to an area to be cleaned corresponding to the liquid image; and
  cleaning the liquid in the area by using the liquid cleaning component.

Alternatively, the self-moving device includes a power supply component, and the power supply component uses a charging component for charging; wherein controlling the self-moving device to move so as to complete the corresponding task based on the object identification result includes:
  determining an actual position of the charging component according to an image position of the charging component, when remaining power of the power supply component is less than or equal to a power threshold, and the environment image includes an image of the charging component.

Alternatively, the self-moving device includes a positioning sensor, and the positioning sensor is used to position a location of a charging port on the charging component; wherein after the self-moving device is controlled and moved to the charging component, the control method further includes:
  controlling the positioning sensor to position the location of the charging component so as to obtain a positioning result, in a process of moving to the charging component; and
  controlling the self-moving device to move according to the positioning result, so as to realize a mating of the self-moving device with the charging port.

A second aspect of the present disclosure provides a control device of a self-moving device, wherein the self-moving device includes an image identification component, and the control device including:
- an image acquisition module, the image acquisition module being adapted to acquire an environment image identified by the image identification component during movement of the self-moving device;
- a model acquisition module, the model acquisition module being adapted to acquire an image identification model, computing resources occupied by the image identification model during operation being lower than maximum computing resources provided by the self-moving device; and
- a device control module, the device control module being adapted to control inputting the environment image into the image identification model so as to obtain an object identification result, the object identification result being used to indicate categories of target objects.

A third aspect of the present disclosure provides a control method for a self-moving device, wherein the self-moving device includes an image identification component, the control method including:
- obtaining a scene image identified by the image identification component during a movement of the self-moving device, the scene image being an image of a current scene where the self-moving device is located;
- performing image identification on the scene image to obtain object information, the object information referring to attribute information of an object located in the current scene;
- obtaining a scene identification model, the scene identification model being obtained by training based on sample object information and a sample scene type corresponding to the sample object information; and
- controlling inputting the object information into the scene identification model so as to obtain a scene type of the current scene.

Alternatively, the scene identification model is obtained by training a probability model.

Alternatively, before obtaining the scene identification model, the method further includes:
- obtaining the probability model;
- obtaining training data, the training data including sample attribute information of each object and the sample scene type corresponding to each sample attribute information;
- inputting the sample attribute information into the probability model to obtain a model result; and
- training the probability model based on a difference between the model result and the sample scene type so as to obtain the scene identification model.

Alternatively, the object information obtained by performing the image identification on the scene image, further includes:
- obtaining an image identification model, computing resources occupied by the image identification model when running being lower than maximum computing resources provided by the self-moving device; and
- inputting the scene image into the image identification model so as to obtain an object identification result.

Alternatively, the image identification model is obtained by training with sample scene images and sample object results based on a small network model.

Alternatively, the image identification model is obtained after model compression processing.

Alternatively, the scene identification model further outputs a confidence level of each scene type; after controlling inputting the object information into the scene identification model so as to obtain the scene type of the current scene, the method further includes:
- sorting the scene types according to their confidence levels in descending order; and
- outputting the scene types ranked in a top N, where N is an integer greater than 1.

Alternatively, after controlling inputting the object information into the scene identification model so as to obtain the scene type of the current scene, the method further includes:
- determining a corresponding cleaning strategy according to the scene type; and
- controlling the self-moving device to perform cleaning work according to the cleaning strategy.

A fourth aspect of the present disclosure provides a scene identification apparatus for a self-moving device, wherein the self-moving device includes an image identification component, the apparatus including:
- an image acquisition module, configured to obtain a scene image identified by the image identification component during a movement of the self-moving device, the scene image being an image of a current scene where the self-moving device is located;
- an image identification module, configured for performing image identification on the scene image to obtain object information, the object information referring to attribute information of an object located in the current scene;
- a model acquisition module, configured to obtain a scene identification model, the scene identification model being obtained by training based on sample object information and a sample scene type corresponding to the sample object information; and
- a device control module, configured for controlling inputting the object information into the scene identification model so as to obtain a scene type of the current scene.

A fifth aspect of the present disclosure provides a control method for a self-moving device, including:
- obtaining edge information of a working area where the self-moving device is located;
- obtaining an environment image captured while moving;
- obtaining access door information based on the environment image; and
- dividing independent areas within the working area based on the access door information and the edge information.

Alternatively, after dividing the independent areas within the working area based on the access door information and the edge information, the method further includes:
- determining a scene prediction result corresponding to the independent areas based on the environment image; and
- determining a scene type of the independent area according to the scene prediction result of the independent area.

Alternatively, dividing the independent areas within the working area based on the access door information and the edge information, includes:
- obtaining position information of a corresponding access door in the working area indicated by the access door information;
- combining the edge information and the position information to obtain combined boundary information; and
- dividing each closed area formed by the combined boundary information into corresponding independent areas.

Alternatively, obtaining the access door information based on the environment image, includes:
  identifying whether the environment image includes an image of an access door; and
  obtaining position information of the access door in the working area when the environment image includes the image of the access door.

Alternatively, the access door includes a door frame in the working area.

Alternatively, determining the scene type of the independent area according to the scene prediction result of the independent areas, includes:
  obtaining pose information of each independent area, the pose information including position information and orientation information of a corresponding independent area in the working area; and
  combining a scene area result of each independent area with the pose information of each independent area, and determining the scene type of each independent area according to a preset probability distribution strategy;
  wherein the probability distribution strategy is used for each target scene type, and it is determined from each independent area that the scene type is the independent area with a highest probability of the target scene type.

Alternatively, determining the scene prediction result corresponding to the independent areas based on the environment image, includes:
  obtaining an image identification model, computing resources occupied by the image identification model during operation being lower than maximum computing resources provided by the self-moving device;
  for each independent area, inputting the environment image corresponding to the independent area into the image identification model to obtain an object identification result, the object identification result including attribute information of a target object;
  obtaining a scene identification model, the scene identification model being obtained by training with sample attribute information and a sample scene type of an object; and
  inputting the object identification result into the scene identification model to obtain the scene prediction result, the scene prediction result including at least one predicted scene type of the independent area.

Alternatively, the image identification model is obtained by training with sample environment images and sample object results based on a small network model.

Alternatively, the scene identification model is obtained by training with the sample attribute information and the sample scene type of the object.

Alternatively, obtaining the access door information based on the environment image, includes:
  inputting the environment image into an image identification model to obtain an object identification result; the object identification result including attribute information of a target object; computing resources occupied by the image identification model during operation being lower than maximum computing resources provided by the self-moving device;
  when the object identification result includes access door information, determining that the environment image includes an image of the access door, and obtaining position information of the access door in the working area.

Alternatively, wherein the method includes obtaining the environment image captured by an image identification component while moving; the access door information refers to access door information in each independent area, and the access door includes a door frame in the working area.

Alternatively, the edge information is path information obtained by traveling along an edge during a movement of the self-moving device; the environment image is read by the self-moving device after work on the working area is completed;
  wherein dividing the independent areas within the working area based on the access door information and the edge information, includes:
  combining the edge information and the position information to obtain combined boundary information, the combined boundary information including a plurality of closed graphics, each closed graphic corresponding to one independent area; and
  dividing each closed area formed by the combined boundary information into corresponding independent areas.

Alternatively, obtaining position information of the access door in the working area based on the environment image, includes:
  obtaining a first distance between the access door and the self-moving device in the environment image output by the image identification model; obtaining a second distance between the time when the environment image is captured and a boundary indicated by the edge information; and determining a position of the access door relative to the boundary indicated by the edge information according to the first distance and the second distance so as to obtain the position information of the access door;
  or, a positioning component being installed on the self-moving device, the self-moving device obtaining a first distance between the access door in the environment image output by the image identification model and the self-moving device; obtaining positioning information acquired by the positioning component when the environment image is collected; and obtaining the position information of the access door according to the first distance and the positioning information;
  dividing the independent areas within the working area based on the access door information and the edge information.

Alternatively, determining the scene type of the independent area according to the scene prediction result of the independent areas, includes:
  obtaining pose information of each independent area, the pose information including position information and orientation information of a corresponding independent area in the working area; and
  combining a scene area result of each independent area with the pose information of each independent area, and determining the scene type of each independent area according to a preset probability distribution strategy;
  wherein the probability distribution strategy is used for each target scene type, and it is determined from each independent area that the scene type is the independent area with a highest probability of the target scene type.

Alternatively, the probability distribution strategy includes that:
  there is corresponding template pose information for each scene type, and the pose information of the independent area is compared with the template pose information of each scene type so as to obtain a pose comparison result;

for each target scene type, a probability result is obtained by multiplying a scene prediction result and the pose comparison result corresponding to the target scene type with a corresponding weight; and a type of the independent area with a highest probability result is determined as the scene type.

A sixth aspect of the present disclosure provides a control device for a self-moving device, including:

a first information acquisition module, configured to obtain edge information of a working area where the self-moving device is located;

an environment image acquisition module, configured to obtain an environment image captured while moving;

a second information acquisition module, configured to obtain access door information based on the environment image; and an area division control module, configured to divide independent areas within the working area based on the access door information and the edge information.

A seventh aspect of the present disclosure provides a control device of a self-moving device, wherein the control device includes a processor and a memory, a program is stored in the memory, the program is loaded by the processor and executed to realize the control method of the self-moving device according to the first aspect, the third aspect or the fifth aspect.

An eighth aspect of the present disclosure provides a computer-readable storage medium, wherein a program is stored in the computer-readable storage medium, and wherein when the program is executed by the processor, the program is used to implement the control method of the self-moving device according to the first aspect, the third aspect or the fifth aspect.

A ninth aspect of the present disclosure provides a self-moving device, including:

a movement component for driving movement of the self-moving device;

a movement driving component for driving movement of the movement component;

an image identification component installed on the self-moving device and adapted to acquire an environment image in a moving direction of the self-moving device; and a control component communicatively connected with the movement driving component and the image identification component, the control component being communicatively connected with a memory, a program being stored in the memory, the program being loaded by the control component and executed to realize the control method of the self-moving device according to the first aspect, the third aspect or the fifth aspect.

Beneficial effects of the present disclosure include: by obtaining the environment images identified by the image identification component during the movement of the self-moving device; by obtaining the image identification model by which computing resources occupied in operation are lower than the maximum computing resources provided by the self-moving device; by obtaining an object identification result through controlling the environment images inputted into the image identification model so as to indicate the category of the target objects in the environment images, the present disclosure can solve the problem that the existing image identification algorithms have high requirements on the hardware of the sweeping robots, which results in a limited application range of the object identification function of the sweeping robots. By using an image identification model that consumes less computing resources to identify target objects in the environment images, the hardware requirements of the object identification method on self-moving device can be reduced, and the application range of the object identification method can be expanded.

The above description is only an overview of the technical solutions of the present disclosure. In order to be able to understand the technical means of the present disclosure more clearly and implement them in accordance with the content of the specification, preferred embodiments of the present disclosure are described in detail below in conjunction with the accompanying drawings.

BRIEF DESCRIPTION OF DRAWINGS

The accompanying drawings described herein are intended to provide a further understanding of the present disclosure and constitute a part of the present disclosure. The exemplary embodiments of the present disclosure and their descriptions are used to explain the present disclosure, and do not constitute an improper limitation of the present disclosure. In the accompanying drawings.

DETAILED DESCRIPTION

Figure 1:
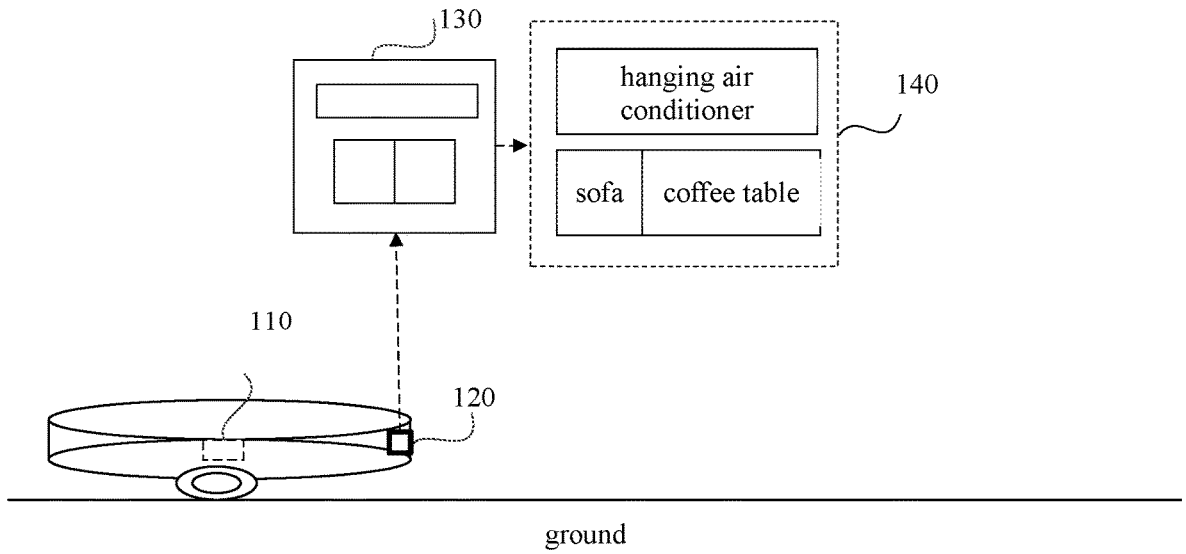
FIG. 1 is a schematic structural diagram of a self-moving device provided by an embodiment of the present disclosure.

The specific embodiments of the present disclosure will be described in further detail below in conjunction with the accompanying drawings. The following embodiments are used to illustrate the present disclosure, but are not used to limit the scope of the present disclosure.

First of all, the following introduces several terms involved in the present disclosure.

Model compression: It refers to reducing the parameter redundancy in the trained network model, thereby reducing the storage occupation, communication bandwidth and computational complexity of the network model.

Model compression includes but is not limited to model tailoring, model quantization and/or low-rank decomposition.

Model tailoring: It refers to the search process of the optimal network structure. The process of model tailoring includes following steps: 1. training the network model; 2. tailoring unimportant weights or channels; 3. fine-tuning or retraining the tailored network. Among them, the second step usually uses iterative layer-by-layer tailoring, fast fine-tuning, or weight reconstruction to maintain accuracy.

Quantization: A quantization model is a general term for model acceleration methods. It is a process of representing a limited range (such as 32-bit) floating-point data in a data type with fewer digits, so as to achieve the goals of reducing model size, reducing model memory consumption, and accelerating model inference speed.

Low-rank decomposition: It refers to decomposing the weight matrix of the network model into multiple small matrices. The calculation amount of the small matrix is smaller than that of the original matrix, thereby reducing the amount of model calculations and reducing the memory occupied by the model.

YOLO model: It is one of the basic network models. It is a neural network model that can achieve target positioning and identification through a convolutional neural network (Convolutional Neural Networks, CNN). YOLO models include YOLO, YOLO v2 and YOLO v3. Among them, YOLO v3 is another target detection algorithm of the YOLO series after YOLO and YOLO v2, and it is an improvement based on YOLO v2. YOLO v3-tiny is a simplified version of YOLO v3, in which some feature layers are removed on the basis of YOLO v3, so as to achieve the effect of reducing the amount of model calculations and faster calculations.

MobileNet model: It is a network model in which the basic unit is a depthwise separable convolution. The depthwise separable convolution can be decomposed into depthwise convolution (Depthwise, DW) and pointwise convolution (Pointwise, PW). DW is different from the standard convolution. For the standard convolution, the convolution kernel is used on all input channels, while DW uses a different convolution kernel for each input channel. In other words, one convolution kernel corresponds to one input channel. The PW is an ordinary convolution, but it uses a 1×1 convolution kernel. For the depthwise separable convolution, it firstly uses DW to convolve different input channels separately, and then uses PW to combine the above outputs. In this way, in fact, the overall calculation result is approximately the same as the calculation result of a standard convolution process, but it will greatly reduce the amount of calculation and the amount of model parameters.

First Embodiment

FIG. 1 is a schematic structural diagram of a self-moving device in accordance with an embodiment of the present disclosure. As shown in FIG. 1, the device at least includes a control component 110 and an image identification component 120 communicatively connected with the control component 110.

The image identification component 120 is used to identify environment images 130 during the movement of the self-moving device, and send the environment images 130 to the control component 110. Alternatively, the image identification component 120 may be implemented as a camera, a video camera, etc. The present embodiment does not limit the implementation manner of the image identification component 120.

Alternatively, field of view of the image identification component 120 is 120° in a horizontal direction and 60° in a vertical direction. Of course, the field of view can also be other values. The present embodiment does not limit the values of the field of view of the image identification component 120. The field of view of the image identification component 120 can ensure that the environment image 130 in the moving direction of the self-moving device can be captured.

In addition, the number of image identification component 120 may be one or more, which is not limited by the present disclosure.

The control component 110 is used to control the self-moving device, for example to control the start and stop of the self-moving device, and to control the start and stop of various components (such as the image identification component 120) in the self-moving device.

In this embodiment, the control component 110 is communicatively connected with a memory. A program is stored in the memory, and the program is loaded by the control component 110 and executed to at least implement the following steps: obtaining the environment image 130 identified by the image identification component 120; obtaining an image identification model; controlling inputting the environment image 130 into the image identification model so as to obtain an object identification result 140. The object identification result 140 is used to indicate categories of target objects in the environment image 130. In other words, the program is loaded and executed by the control component 110 to implement a control method of the self-moving device provided in the present disclosure.

In one example, when the target object is included in the environment image, the object identification result 140 is the type of the target object; when the target object is not included in the environment image, the object identification result 140 is empty. Or, when the target object is included in the environment image, the object identification result 140 is an indication that the target object is included (for example, the target object is indicated by "1") and the type of the target object; when the target object is not included in the environment image, the object identification result 140 is an indication that the target object is not included (for example, "0" indicates that the target object is not included).

Among them, computing resources occupied by the image identification model during operation are lower than maximum computing resources provided by the self-moving device Alternatively, the object identification result 140 may also include, but is not limited to, information such as the position and size of the image of the target object in the environment image 130.

Alternatively, the target object is an object located in a working area of the self-moving device. For example, when the working area of the self-moving device is a room, the target object can be a bed, a table, a chair, a person, etc., in the room. When the working area of the self-moving device is a logistics warehouse, the target object can be a box or a person etc., in the warehouse. This embodiment does not limit the type of the target object.

Alternatively, the image identification model is a network model in which the number of model layers is less than a first value; and/or the number of nodes in each layer is less than a second value. Wherein, the first value and the second value are both small integers, so as to ensure that the image identification model consumes less computing resources during operation.

It should be supplemented that, in this embodiment, the self-moving device may also include other components, such as a movement component (such as a wheel) used to drive the self-moving device to move, and a movement driving component (such as a motor) and so on. Wherein, the movement driving component is communicatively connected with the control component 110, and the movement driving component runs and drives the movement component to move under the control of the control component 110, thereby realizing the overall movement of the self-moving device. In this embodiment, the components included in the self-moving device are not listed one by one here.

In addition, the self-moving device may be a sweeping robot, an automatic lawn mower, or other devices with automatic driving function, and the present disclosure does not limit the type of the self-moving device.

In this embodiment, by using an image identification model that consumes less computing resources to identify the target object in the environment image 130, the hardware requirements of the object identification method on the self-moving device can be reduced, and the application range of the object identification method can be expanded.

Second Embodiment

The following describes in detail the control method of the self-moving device provided in the present disclosure.

Figure 2:
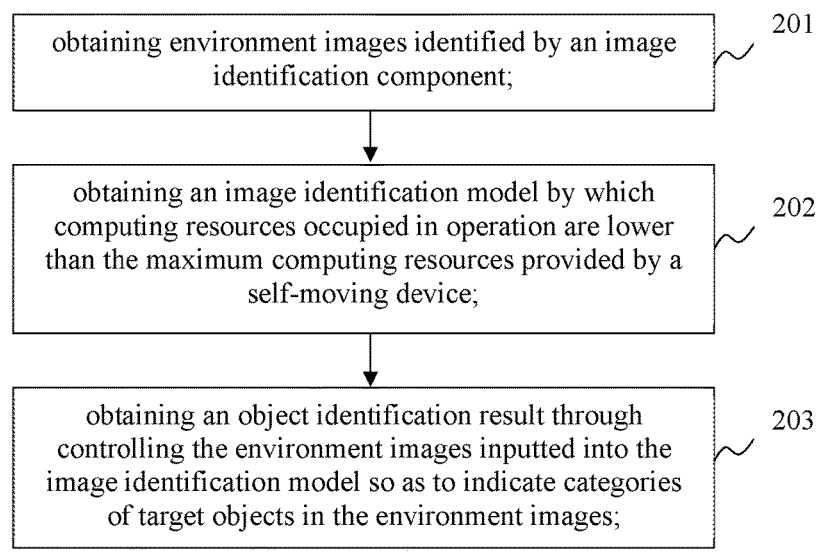
FIG. 2 is a flowchart of a control method of the self-moving device provided by an embodiment of the present disclosure.

FIG. 2 is a flowchart of a control method of the self-moving device. In FIG. 2, the control method of the self-moving device is used in the self-moving device shown in FIG. 1, and the execution subject of each step is the control component 110 as an example for description. Referring to FIG. 2, the control method includes at least the following steps:

Step 201: obtaining an environment image identified by the image identification component.

Alternatively, the image identification component is used to capture video data, and at this time, the environment image may be one frame of image data in the video data; or, the image identification component is used to capture a single image data, and at this time, the environment image is a single piece of image data sent by the image identification component.

Step 202: obtaining an image identification model. The computing resources occupied by the image identification model during operation are lower than the maximum computing resources provided by the self-moving device.

In this embodiment, by using the image identification model with computing resources lower than the maximum computing resources provided by the self-moving device, the hardware requirements of the image identification model on the self-moving device can be reduced, and the application range of the object identification method can be expanded.

In one example, the pre-trained image identification model is read by the self-moving device. At this time, the image identification model is obtained by training a small network detection model. Training the small network detection model includes: obtaining the small network detection model; obtaining training data; inputting the training image into the small network detection model to obtain a model result; and training the small network detection model, based on the difference between the model result and the identification result corresponding to the training image, so as to obtain the image identification model.

Wherein, the training data includes the training images of each object in the working area of the self-moving device and the identification result of each training image.

In this embodiment, the small network model refers to a network model in which the number of model layers is less than the first value; and/or, the number of nodes in each layer is less than the second value. Wherein, the first value and the second value are both smaller integers. For example, the small network detection model is a miniature YOLO model a MobileNet model. Of course, the small network detection model may also be other models, which will not be listed one by one here in this embodiment.

Alternatively, in order to further compress the computing resources occupied during the operation of the image identification model, after the small network detection model is trained to obtain the image identification model, the self-moving device can also perform model compression processing on the image identification model so as to obtain the image identification model used to identify the object.

Alternatively, the model compression processing includes, but is not limited to: model tailoring, model quantization and/or low-rank decomposition.

Alternatively, after the model compression is completed, the self-moving device can use the training data again to train the image identification model, so as to improve the identification accuracy of the image identification model.

Step 203: controlling the environment image inputted into the image identification model to obtain the object identification result, and the object identification result is used to indicate the category of the target object.

Alternatively, the object identification result also includes, but is not limited to, information such as the position and/or size of the image of the target object in the environment image.

In summary, according to the control method of the self-moving device provided in this embodiment, by obtaining the environment images identified by the image identification component during the movement of the self-moving device; by obtaining the image identification model by which computing resources occupied in operation are lower than the maximum computing resources provided by the self-moving device; by obtaining the object identification result through controlling the environment images inputted into the image identification model so as to indicate the category of the target objects in the environment images, the present disclosure can solve the problem that the existing image identification algorithms have high requirements on the hardware of the sweeping robots, which results in a limited application range of the object identification function of the sweeping robots. By using an image identification model that consumes less computing resources to identify target objects in the environment images, the hardware requirements of the object identification method on self-moving device can be reduced, and the application range of the object identification method can be expanded.

In addition, the image identification model is obtained by training and learning using the small network model, and the combination of a graphics processor (Graphics Processing Unit, GPU) and an embedded neural network processor (Neural-network Processing Units, NPU) is not required to realize the object identification process. Therefore, the requirements for the device hardware of the object identification method can be reduced.

In addition, performing model compression processing on the image identification model to obtain the image identification model used to identify the object can further reduce the computing resources occupied by the image identification model during operation, increase the identification speed, and expand the application range of the object identification method.

Alternatively, based on the foregoing embodiment, in the present disclosure, after the object identification result is obtained by the self-moving device, the self-moving device is further controlled to move based on the object identification result to complete corresponding tasks. These tasks include but are not limited to: realizing the task of avoiding obstacles for certain objects, such as avoiding obstacles for chairs, pet feces, etc.; the task of positioning certain objects, such as positioning doors and windows, charging components, etc.; the task of monitoring and following people; the task of cleaning specific items, such as cleaning liquid; and/or, the task of automatic refilling. Below, the tasks executed corresponding to different object identification results are introduced.

Alternatively, a liquid cleaning component is installed on the self-moving device. At this time, after the step 203, controlling the self-moving device to move so as to complete the corresponding task based on the object identification result includes: when the object identification result indicates that the environment image contains a liquid image, controlling the self-moving device to move to an area to be cleaned corresponding to the liquid image; and cleaning the liquid in the area by using the liquid cleaning component.

In one example, the liquid cleaning component includes a water-absorbing mop installed on the periphery of a wheel body of the self-moving device. When there is a liquid image in the environment image, the self-moving device is controlled to move to the area to be cleaned corresponding to the liquid image, so that the wheel of the self-moving device passes through the area to be cleaned. As a result, the water-absorbing mop absorbs the liquid on the ground. The self-moving device also includes a cleaning tank and a reservoir. The cleaning tank is located under the wheel body. A water pump sucks the water in the reservoir, sprays it from a nozzle to the wheel body through a pipe, and flushes the dirt on the water-absorbing mop to the cleaning tank. A pressure roller is provided on the wheel body to wring out the water-absorbing mop.

Of course, the above-mentioned liquid cleaning components are only illustrative. In actual implementation, the liquid cleaning component may also be realized in other ways, which will not be listed one by one here in the embodiment.

Figure 3:
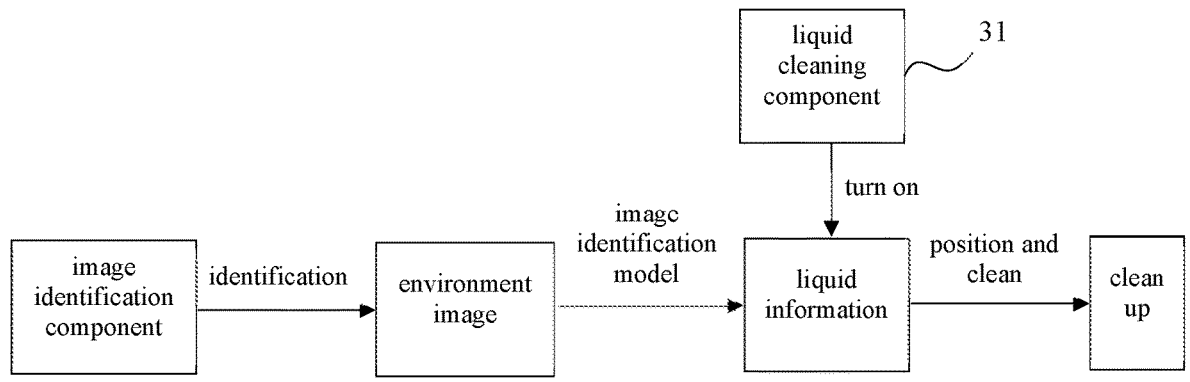
FIG. 3 is a flowchart of an execution work strategy provided by an embodiment of the present disclosure.
Figure 4:
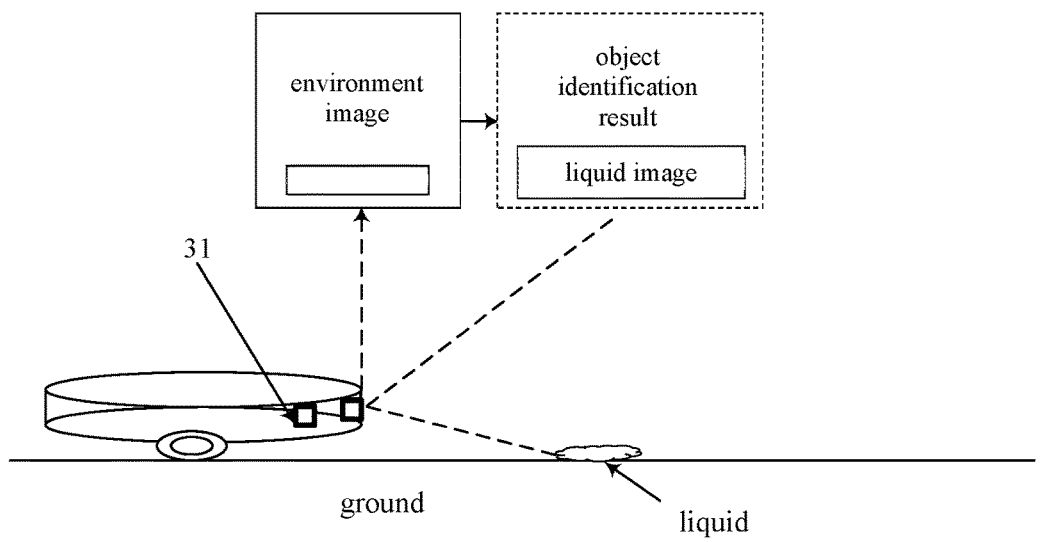
FIG. 4 is a schematic diagram of an execution work strategy provided by an embodiment of the present disclosure.

In order to have a clearer understanding of the manner of executing the corresponding work strategy based on the object identification result, refer to the schematic diagrams of executing the cleaning liquid work strategy shown in FIGS. 3 and 4. According to FIGS. 3 and 4, it can be seen that after the self-moving device captures the environment image, the image identification model is used to obtain the object identification result of the environment image. When the object identification result is that the current environment includes the liquid, the liquid cleaning component 31 is used to clean the liquid.

Alternatively, in this embodiment, the self-moving device may be a sweeping robot. At this time, the self-moving device has the function of removing all dry and wet garbage.

In this embodiment, by activating the liquid cleaning component when there is a liquid image in the environment image, the self-moving device can avoid the problem that the self-moving device circumvents the liquid and the cleaning task cannot be completed; and the cleaning effect of the self-moving device can be improved. At the same time, liquid can be prevented from entering the self-moving device, causing circuit damage, and the risk of damage to the self-moving device can be reduced.

Alternatively, based on the above embodiment, a power supply component is installed in the self-moving device. Controlling the self-moving device to move so as to complete the corresponding task based on the object identification result, includes determining the actual position of the charging component by the self-moving device according to the image position of the charging component, when the remaining power of the power supply component is less than or equal to the power threshold, and the environment image includes the image of the charging component; and controlling the self-moving device to move to the charging component.

Since the image of the charging component is identified by the self-moving device, the direction of the charging component relative to the self-moving device can be determined according to the position of the image in the environment image. Therefore, the self-moving device can move to the charging component according to the roughly determined direction.

Alternatively, in order to improve the accuracy of the movement of the self-moving device to the charging component, a positioning sensor is also installed on the self-moving device. The positioning sensor is used to position the location of the charging port on the charging component. At this time, when the self-moving device is controlling the movement of the self-moving device to the charging component, the positioning sensor is controlled to position the location of the charging component to obtain the positioning result; the self-moving device is controlled to move according to the positioning result to realize the mating of the self-moving device with the charging port.

In one example, the positioning sensor is a laser sensor. At this time, the charging port of the charging component emits laser signals at different angles. The positioning sensor determines the position of the charging port based on the angle difference of the laser signals which are received.

Of course, the positioning sensor can be other types of sensors, and this embodiment does not limit the type of the positioning sensor.

Figure 5:
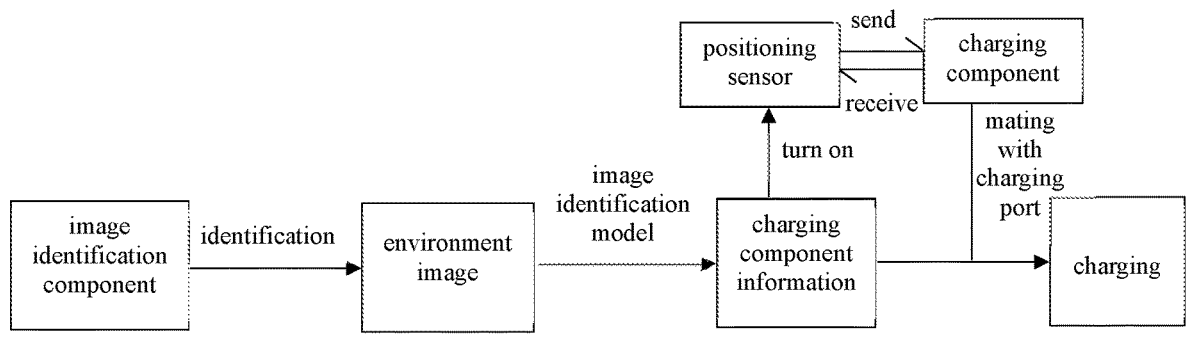
FIG. 5 is a flowchart of an execution work strategy provided by another embodiment of the present disclosure.
Figure 6:
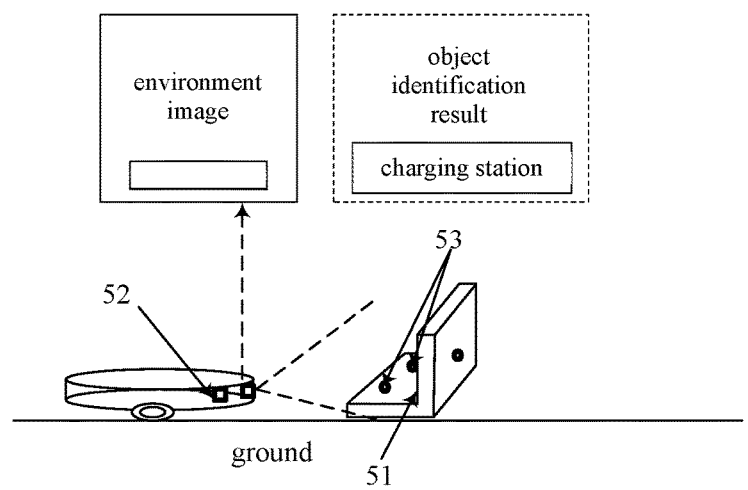
FIG. 6 is a schematic diagram of an execution work strategy provided by another embodiment of the present disclosure.

In order to have a clearer understanding the manner of executing the corresponding work strategy based on the object identification result, refer to the schematic diagrams of executing the cleaning liquid work strategy shown in FIGS. 5 and 6. According to FIGS. 5 and 6, it can be seen that after the self-moving device captures the environment image, the image identification model is used to obtain the object identification result of the environment image. When the object identification result is that the current environment includes the charging component 51, the positioning sensor 52 is used to position the location of the charging port 53 on the charging component 51; and the self-moving device moves to the charging port 53 so that the self-moving device is electrically connected to the charging component 51 through the charging port to realize charging.

In this embodiment, the charging component is identified through the image identification model and moved to the vicinity of the charging component, so that the self-moving device can automatically return to the charging component for charging, thereby improving the intelligence of the self-moving device.

In addition, determining the position of the charging port on the charging component through the positioning sensor can improve the accuracy when the self-moving device automatically returns to the charging component, thereby improving the efficiency of automatic charging.

Third Embodiment

Figure 7:
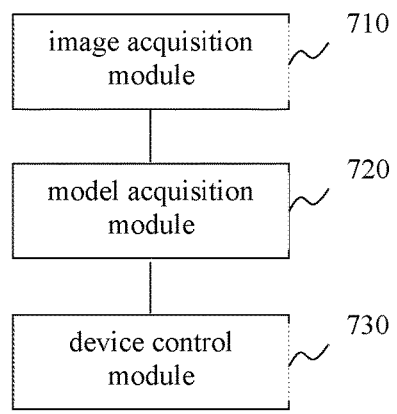
FIG. 7 is a block diagram of a control device of a self-moving device provided by an embodiment of the present disclosure.

FIG. 7 is a block diagram of a control device for the self-moving device provided by an embodiment of the present disclosure. In this embodiment, the application of the device in the self-moving device shown in FIG. 1 is taken as an example for description. The control device includes at least the following modules: an image acquisition module 710, a model acquisition module 720 and a device control module 730.

The image acquisition module 710 is adapted to acquire the environment image identified by the image identification component during the movement of the self-moving device.

The model acquisition module 720 is adapted to acquire the image identification model. The computing resources occupied by the image identification model during operation are lower than the maximum computing resources provided by the self-moving device.

The device control module 730 is adapted to control inputting the environment image into the image identification model to obtain the object identification result. The object identification result is used to indicate the category of the target object.

For related details, refer to the above method embodiment.

It should be noted that, when the control device of the self-moving device provided in the above embodiment performs the control of the self-moving device, only the division of the above-mentioned functional modules is used for illustration. In practical applications, the above-mentioned functions can be allocated by different functional modules as required. That is, the internal structure of the control device of the self-moving device is divided into different functional modules in order to complete all or part of the functions described above. In addition, the control device of the self-moving device provided in the above-mentioned embodiment belongs to the same concept as the embodiment of the control method of the self-moving device. For the specific implementation process, please refer to the method embodiment, which will not be repeated here.

Fourth Embodiment

Figure 8:
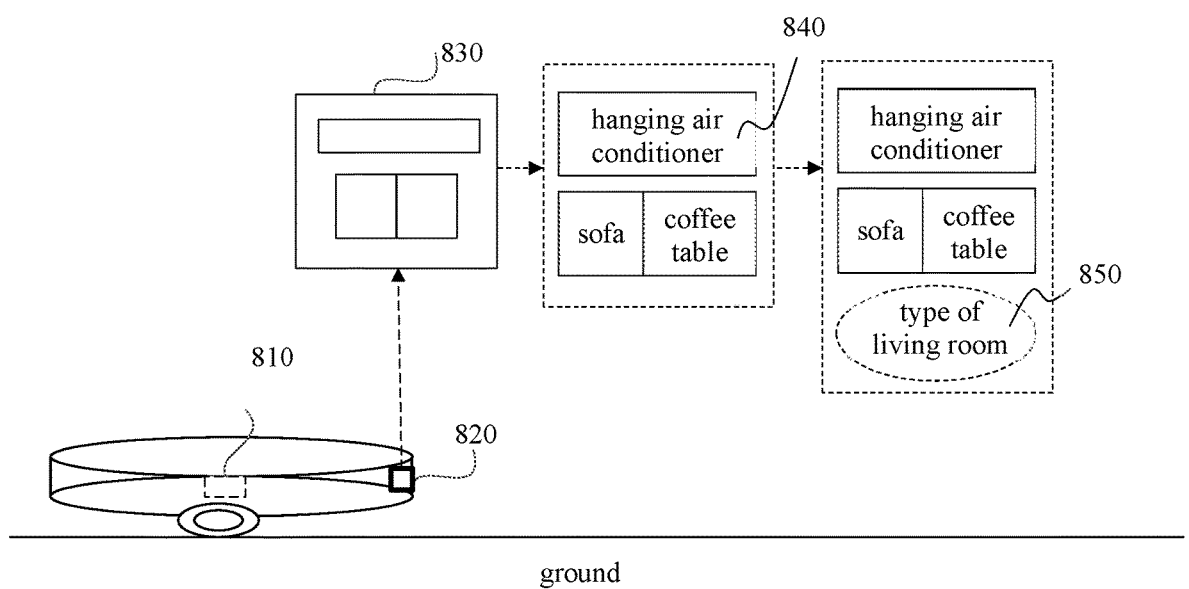
FIG. 8 is a schematic structural view of a self-moving device provided by an embodiment of the present disclosure.

FIG. 8 is a schematic structural diagram of a self-moving device provided by an embodiment of the present disclosure. As shown in FIG. 8, the system at least includes: a control component 810 and an image identification component 820 communicatively connected with the control component 810.

The image identification component 820 is used to identify scene images, and send the scene images to the control component 810. Alternatively, the image identification component 820 may be implemented as a camera, a video camera, etc. The present embodiment does not limit the implementation manner of the image identification component 820.

Alternatively, field of view of the image identification component 820 is 20° in a horizontal direction and 60° in a vertical direction. Of course, the field of view can also be other values. The present embodiment does not limit the values of the field of view of the image identification component 820. The field of view of the image identification component 820 can ensure that the environment image 130 in the moving direction of the self-moving device can be captured.

In addition, the number of image identification component 820 may be one or more, which is not limited by the present disclosure.

The control component 810 is used to control the self-moving device, for example to control the start and stop of the self-moving device, and to control the start and stop of various components (such as the image identification component 820) in the self-moving device.

In this embodiment, the control component 810 is communicatively connected with a memory. A program is stored in the memory, and the program is loaded by the control component 810 and executed to at least implement the following steps: obtaining a scene image 830 identified by the image identification component 820 during a movement of the self-moving device; performing image identification on the scene image 830 to obtain object information 840, the object information 840 referring to attribute information of an object located in the current scene; obtaining a scene identification model; and controlling inputting the object information 840 into the scene identification model so as to obtain a scene type 850 of the current scene. In other words, the program is loaded and executed by the control component 810 to implement a control method of the self-moving device provided in the present disclosure The scene identification model is obtained by training based on the sample object information 840 and the sample scene type 850 corresponding to the sample object information 840.

Alternatively, the attribute information of the object includes but is not limited to: the type of the object and the position of the image of the object in the scene image 830.

The scene type 850 is used to indicate the type of working environment in which the self-moving device is currently located. The dividing method of the scene type 850 is set according to the working environment of the self-moving device. For example, if the working environment of the self-moving device is a room, the scene type 850 includes: bedroom type, kitchen type, study room type, bathroom type, etc. The present embodiment does not limit the division manner of the scene type 850.

It should be supplemented that, in this embodiment, the self-moving device may also include other components, such as a movement component (such as a wheel) used to drive the self-moving device to move, and a movement driving component (such as a motor) and so on. Wherein, the movement driving component is communicatively connected with the control component 810, and the movement driving component runs and drives the movement component to move under the control of the control component 810, thereby realizing the overall movement of the self-moving device. In this embodiment, the components included in the self-moving device are not listed one by one here.

In addition, the self-moving device may be a sweeping robot, an automatic lawn mower, or other devices with automatic driving function, and the present disclosure does not limit the type of the self-moving device.

In this embodiment, by using the scene identification model to identify the scene type, the self-moving device can identify the scene type of the current working environment and provide more information for the user.

Fifth Embodiment

Figure 9:
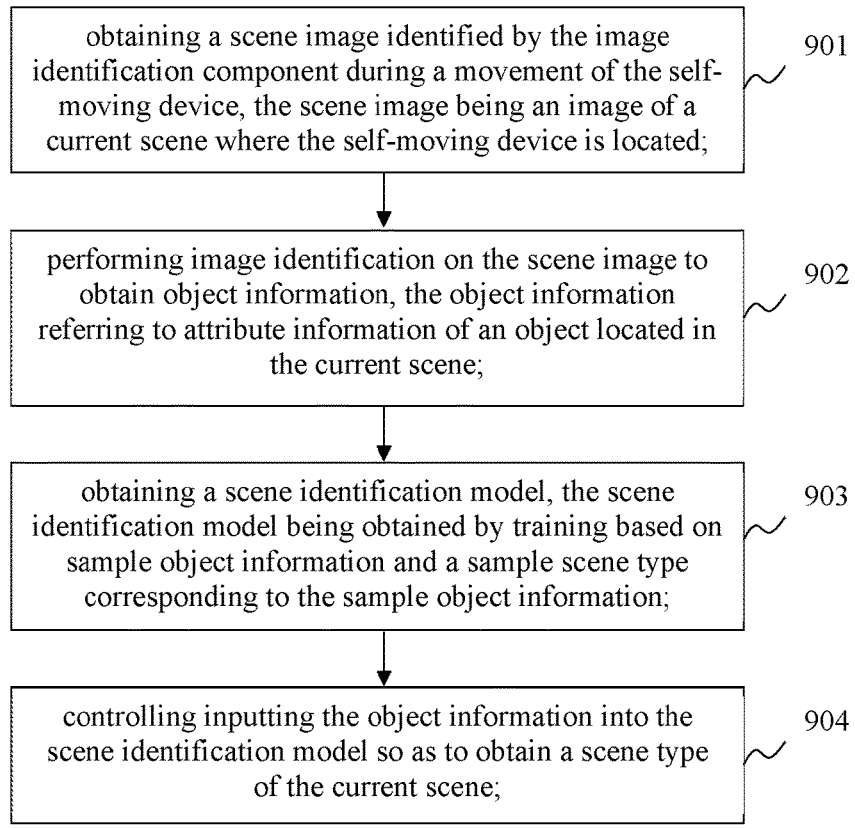
FIG. 9 is a flowchart of a control method of a self-moving device provided by an embodiment of the present disclosure.

FIG. 9 is a flowchart of a control method for a self-moving device provided by an embodiment of the present disclosure. This embodiment is described by taking the method applied to the self-moving device shown in FIG. 8 as an example, and the execution subject of each step is the control component 810 in the system. The method includes at least the following steps:

Step 901, obtaining a scene image identified by the image identification component during a movement of the self-moving device, the scene image being an image of a current scene where the self-moving device is located.

Alternatively, the image identification component is used to capture video data. In this case, the scene image can be image data of one frame in the video data. Alternatively, the image identification component is used to acquire image data of a single sheet. In this case, the scene image is the single image data sent by the image identification component.

Step 902, performing image identification on the scene image to obtain object information, the object information referring to attribute information of an object located in the current scene.

In one example, an image identification model is stored in the self-moving device. When performing the image identification on the scene image, the image identification model is obtained from the self-moving device. The scene image is input into the image identification model to obtain object information.

Alternatively, in order to reduce the hardware requirements of the object identification process on the self-moving device, the computing resources occupied by the image identification model during operation are lower than the maximum computing resources provided by the self-moving device.

In one example, the image identification model is obtained by training with sample scene images and sample object results based on a small network model. The small network model refers to a network model in which the number of model layers is less than the first value; and/or, the number of nodes in each layer is less than the second value. Wherein, the first value and the second value are both smaller integers. For example, the small network detection model is a miniature YOLO model a MobileNet model. Of course, the small network detection model may also be other models, which will not be listed one by one here in this embodiment.

Alternatively, in order to further compress the computing resources occupied during the operation of the image identification model, after the small network detection model is trained to obtain the image identification model, the self-moving device can also perform model compression processing on the image identification model so as to obtain the image identification model used to identify the object. The model compression processing includes, but is not limited to: model tailoring, model quantization and/or low-rank decomposition.

Of course, in other embodiments, the image identification model may also be established based on a deep network neural model, for example, established based on a convolutional neural network.

Alternatively, the object is an object in the working area of the self-moving device, such as a table, a bed, a chair, a sofa, and the like. The attribute information of the object includes type information of the object. The type information of the object is divided based on the working environment of the self-moving device. For example, when the working environment of the self-moving device is a room, the type information of the object includes: table type, chair type, sofa type, liquid type, charging station type, etc. This embodiment does not limit the dividing method of the types of objects.

Of course, the attribute information of the object may also include other information, such as: position information, size of the object of the object and so on in the scene image. This embodiment does not limit the specific content included in the attribute information of the object.

Alternatively, after the model compression is completed, the self-moving device can use the training data again to train the image identification model, so as to improve the identification accuracy of the image identification model.

Step 903, obtaining a scene identification model, the scene identification model being obtained by training based on sample object information and a sample scene type corresponding to the sample object information.

In one example, a pre-trained scene identification model is read from a self-moving device. The scene identification model is obtained by training a probability model. At this time, before obtaining the scene identification model, the probability model needs to be trained. Training the probability model includes: obtaining the probability model; obtaining training data, the training data comprising sample attribute information of each object and the sample scene type corresponding to each sample attribute information; inputting the sample attribute information into the probability model to obtain a model result; and training the probability model based on a difference between the model result and the sample scene type so as to obtain the scene identification model.

In this embodiment, by using the scene identification model trained based on the sample object information and the sample scene corresponding to the sample object information, the self-moving device can be provided with the function of recognizing the scene type, and the intelligence of the self-moving device can be improved.

Step 904, controlling inputting the object information into the scene identification model so as to obtain a scene type of the current scene.

Alternatively, the scene type is pre-divided based on the working environment of the self-moving device. In one example, the working environment of the self-moving device is a room, and the scene types include but are not limited to: kitchen type, living room type, bedroom type, bathroom type, storage room type, and/or study type. At this time, the scene type of the current scene is one or more of the scene types that have been divided in advance.

Figure 10:
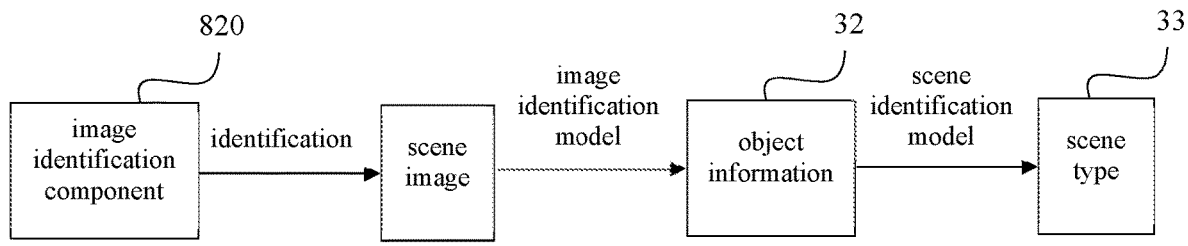
FIG. 10 is a flowchart of a control method of a self-moving device provided by another embodiment of the present disclosure.

In order to understand the scene identification method provided by the present disclosure more clearly, the scene identification method is illustrated below with an example. Referring to FIG. 10, after the scene image is captured by the self-moving device using the image identification component 820, the scene image is input into the image identification model to obtain the object information 32. After outputting the object information to the scene identification model, the scene type 33 of the current scene is obtained.

Alternatively, the scene identification model further outputs a confidence level of each scene type, and the confidence level is used to indicate the output accuracy of each scene type. At this time, after the step 904, the self-moving device sorts the scene types according to their confidence levels in descending order; and outputs the scene types ranked in a top N, where N is an integer greater than 1.

Alternatively, the value of N is stored in the self-moving device, and the value of N may be 3, 2, etc. The value of N is not limited in this embodiment. When the number of scene types output by the scene identification model is less than N, the automatic device outputs all scene types.

In one example, the user terminal is communicatively connected with the self-moving device. At this time, outputting the scene types ranked in the top N includes: sending the scene types ranked in the top N to the user terminal, so that the user terminal displays the scene types ranked in the top N.

In another example, an information output component, such as a display screen or an audio playback component, is installed on the self-moving device. At this time, outputting the scene types ranked in the top N includes: outputting the scene types ranked in the top N through an output component.

Alternatively, after determining the scene type of the current scene, the self-moving device may also determine a corresponding working strategy according to the scene type of the current scene; and control the self-moving device to perform cleaning work according to the cleaning strategy.

In one example, the self-moving device is a floor cleaning device. At this time, when the scene type of the current scene is a dry area type, it is determined that the corresponding work strategy is to use a first cleaning component to clean the current scene, and the self-moving device is controlled to use the first cleaning component to clean the current scene. When the scene type of the current scene is a wet area type, it is determined that the corresponding work strategy is to use a second cleaning component to clean the current scene, and the second cleaning component is used to clean the current scene.

The type of drying area includes but is not limited to: bedroom type, study type and/or living room type. Correspondingly, the first cleaning component is a component for cleaning dust, such as a brush and the like. The type of wet area type includes, but is not limited to: kitchen type and/or toilet type. Correspondingly, the second cleaning component is a component for cleaning liquid, such as an absorbent mop and the like.

Of course, according to different working environments of the self-moving device, the corresponding working strategy may also be other working strategies, which are not listed one by one in this embodiment.

In summary, according to the control method of the self-moving device provided in this embodiment, by obtaining the scene image identified by the image identification component; by performing the image identification on the scene image to obtain object information, the object information referring to attribute information of the object located in the current scene; by obtaining the scene identification model by training based on sample object information and a sample scene type corresponding to the sample object information; and by controlling inputting the object information into the scene identification model so as to obtain the scene type of the current scene, the present disclosure can solve the problem that the scene type of the current scene cannot be judged from the self-moving device. Since the scene identification model is used, the scene type of the scene in which the self-moving device is currently located can be determined, the scene type can be recognized, and the intelligence of the self-moving device can be improved.

In addition, by obtaining the confidence levels of the scene types output by the scene identification model, and outputting the N scene types with the highest confidence level, the accuracy of the output result can be improved.

Sixth Embodiment

Figure 11:
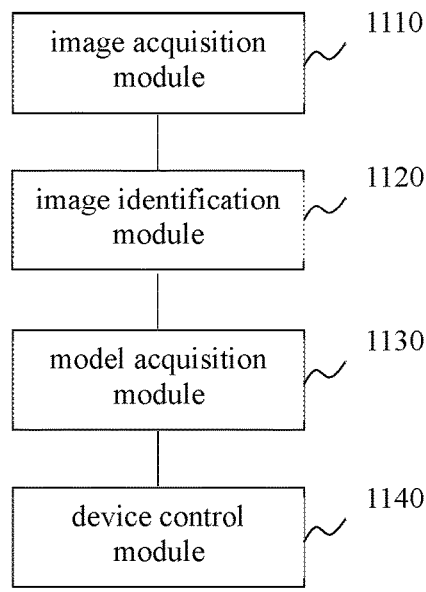
FIG. 11 is a block diagram of a control device for a self-moving device provided by an embodiment of the present disclosure.

FIG. 11 is a block diagram of a control device for a self-moving device provided by an embodiment of the present disclosure. This embodiment is described by taking the device applied to the control component 810 in the self-moving device shown in FIG. 8 as an example. The device at least includes the following modules: an image acquisition module 1110, an image identification module 1120, a model acquisition module 430 and a device control module 1140.

The image acquisition module 1110 is configured for obtaining a scene image identified by the image identification component during a movement of the self-moving device. The scene image is an image of a current scene where the self-moving device is located.

The image identification module 1120 is configured for performing image identification on the scene image to obtain object information. The object information refers to attribute information of an object located in the current scene.

The model acquisition module 1130 is configured for obtaining a scene identification model. The scene identification model is obtained by training based on sample object information and a sample scene type corresponding to the sample object information.

The device control module 1140 is configured for controlling inputting the object information into the scene identification model so as to obtain a scene type of the current scene.

For related details, refer to the above method embodiment.

It should be noted that: when the self-moving device provided in the above embodiment performs scene identification, only the division of the above functional modules is used as an example for illustration. In practical applications, the above-mentioned functions can be assigned to different function modules as required. That is, the internal structure of the self-moving device is divided into different functional modules to complete all or part of the functions described above. In addition, the control method for the self-moving device provided by the above-mentioned embodiments and the embodiment of the control device for the self-moving device belong to the same concept, and the specific implementation process thereof is detailed in the method embodiment, which will not be repeated here.

Seventh Embodiment

Figure 12:
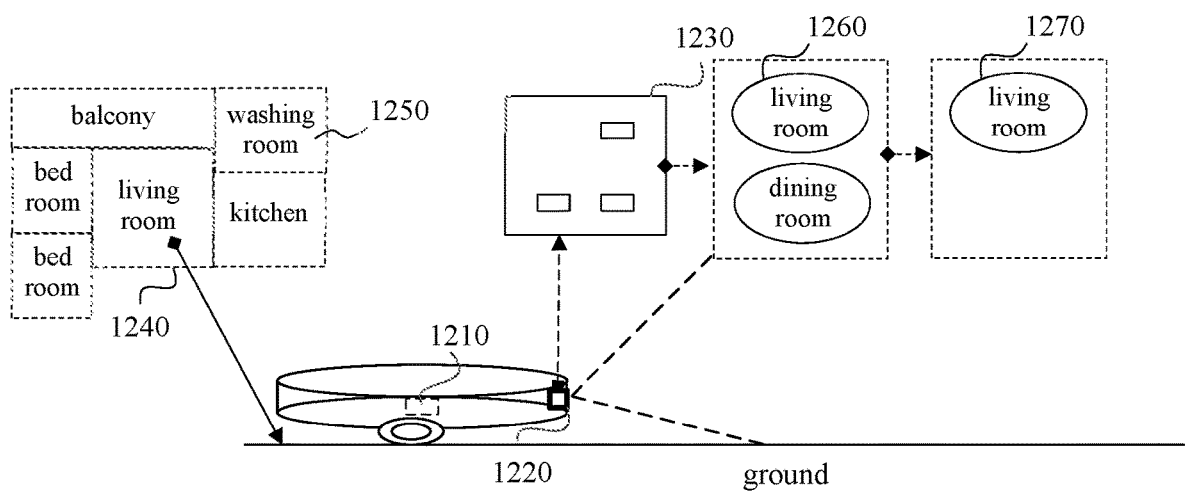
FIG. 12 is a schematic structural view of a self-moving device provided by an embodiment of the present disclosure.

FIG. 12 is a schematic structural diagram of a self-moving device provided by an embodiment of the present disclosure. As shown in FIG. 12, the system at least includes: a control component 1210 and an image identification component 1220 communicatively connected with the control component 1210.

The image identification component 1220 is used for capturing an environment image 1230 during the movement of the self-moving device; and sending the environment image 1230 to the control component 1210. Alternatively, the image identification component 1220 may be implemented as a camera, a video camera, or the like, and the implementation manner of the image identification component 1220 is not limited in this embodiment.

Alternatively, field of view of the image identification component 1220 is 120° in a horizontal direction and 60° in a vertical direction. Of course, the field of view can also be other values. The present embodiment does not limit the values of the field of view of the image identification component 1220. The field of view of the image identification component 1220 can ensure that the environment image 1230 in the moving direction of the self-moving device can be captured.

In addition, the number of image identification component 1220 may be one or more, which is not limited by the present disclosure.

The control component 1210 is used to control the self-moving device, for example to control the start and stop of the self-moving device, and to control the start and stop of various components (such as the image identification component 1220) in the self-moving device.

In this embodiment, the control component 1210 is communicatively connected to a memory in which a program is stored. The program is loaded and executed by the control component 1210 to implement at least the following steps: for obtaining edge information 1240 of a working area where the self-moving device is located; obtaining an environment image 1230 captured while moving; obtaining access door information based on the environment image 1230; and dividing independent areas 1250 within the working area based on the access door information and the edge information 1240. In other words, the program is loaded and executed by the control component 1210 to implement the control method from the self-moving device provided by the present disclosure.

The independent area 1250 refers to an area in the working area that has different attributes from other areas, such as a bedroom area, a living room area, a dining area, and a kitchen area in a room. Since different independent areas are usually divided by the access doors and walls, the boundary line between the wall and the ground can be obtained through the edge information, and the position of the access door can be obtained from the access door information. Therefore, area division can be performed by combining the edge information and the access door information.

The edge information 1240 refers to information of the ground boundary of each independent area. The edge information includes the position and length of the corresponding ground boundary. The access door information refers to the information of the access door in each independent area. The access door information includes information on the location of the door frame and/or door in the working area. The access door is a door that allows people, self-moving devices, and/or other objects to enter or exit an independent area. The access door may be an open virtual door (that is, a door without isolation objects such as door panels), or a solid door, and the type of the access door is not limited in this embodiment.

It should be supplemented that the position information of the door frame and/or door in the working area refers to a geographic location of a projected position of the door frame and/or door in the working area in a vertical projection direction to the ground.

Alternatively, after dividing the independent area 1250 in the working area, the control component 1210 may further implement the following steps: determining a scene prediction result 1260 corresponding to the independent areas 1250 based on the environment image 1230; and determining a scene type 1270 of the independent area 1250 according to the scene prediction result 1260 of the independent area 1250.

The scene type 1270 is used to indicate the type of working environment in which the self-moving device is currently located. The dividing method of the scene type 1270 is set according to the working environment of the self-moving device. For example, if the working environment of the self-moving device is a room, the scene type 1270 includes: bedroom type, kitchen type, study room type, bathroom type, etc. The present embodiment does not limit the division manner of the scene type 1270.

It should be supplemented that, in this embodiment, the self-moving device may also include other components, such as a movement component (such as a wheel) used to drive the self-moving device to move, and a movement driving component (such as a motor) and so on. Wherein, the movement driving component is communicatively connected with the control component 1210, and the movement driving component runs and drives the movement component to move under the control of the control component 1210, thereby realizing the overall movement of the self-moving device. In this embodiment, the components included in the self-moving device are not listed one by one here.

In addition, the self-moving device may be a sweeping robot, an automatic lawn mower, or other devices with automatic driving function, and the present disclosure does not limit the type of the self-moving device.

In this embodiment, the working area is divided into a plurality of independent areas by combining the edge information and the access door information, so as to solve the problem that the existing technology cannot realize the division of the working area. The present disclosure can realize dividing of the working area, so as to achieve the effect of individualized work according to the divided independent areas. In addition, since the access door can be an open virtual door, the information of the virtual door and the edge information can be combined to obtain the area boundary of each independent area, so as to divide the corresponding independent area, which can realize the area division of the open door scene and improve the accuracy of area division.

Eighth Embodiment

The control method of the self-moving device provided by the present disclosure will be described in detail below.

Figure 13:
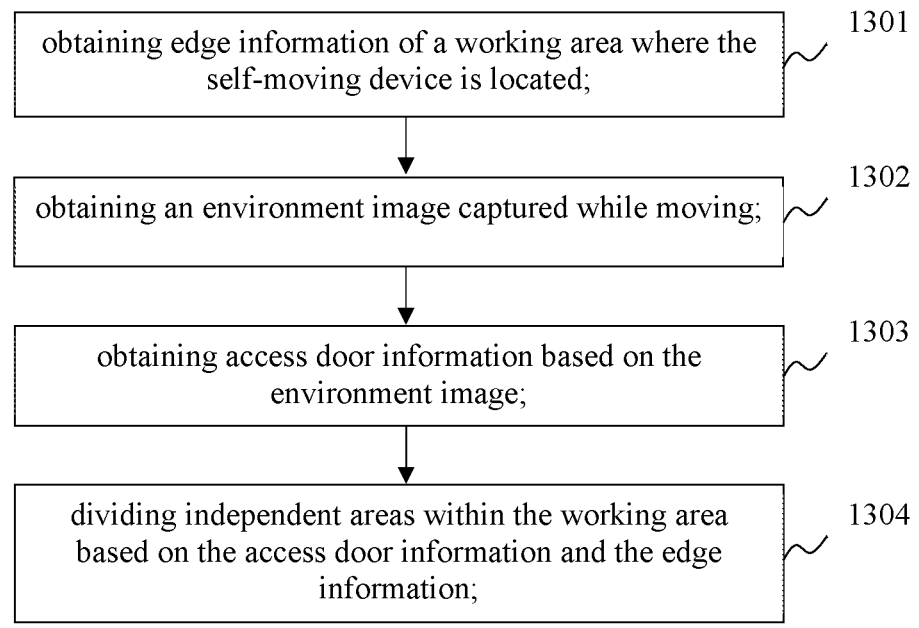
FIG. 13 is a flowchart of a control method of a self-moving device provided by an embodiment of the present disclosure.

FIG. 13 is a flowchart of a control method from a self-moving device. In FIG. 13, the control method for the self-moving device is used in the self-moving device shown in FIG. 1, and the execution subject of each step is the control component 1210 as an example for description. The method includes at least the following steps:

Step 1301, obtaining edge information of a working area where the self-moving device is located.

The edge information refers to the information of the ground boundary of each independent area. The edge information includes the position and length of the corresponding ground boundary. The edge information is the path information obtained by driving along the edge during the movement of the self-moving device.

Alternatively, the self-moving device has an edge driving function. Under this function, if the self-moving device drives along the boundary formed by a wall and the ground, the edge information of the boundary can be obtained. If the self-moving device drives along the boundary formed by an object (such as a cabinet, table, bed, etc.) and the ground, the edge information of the boundary can be obtained.

Step 1302, obtaining an environment image captured while moving.

The working time (or time stamp) when moving in the working area and the environment image corresponding to the working time are recorded by the self-moving device. After work on the working area is complete, the environment image is read.

In one example, after the current work is completed, the self-moving device reads the environment images in the time period corresponding to a start time to an end time from the stored environment images according to the start time and end time of the current work.

Step 1303, obtaining access door information based on the environment image.

Whether or not the environment image includes an image of an access door is identified. When the environment image includes the image of the access door, position information of the access door in the working area is obtained.

The access door is a passage for a self-moving device to enter or leave an independent area. The access door may be a door frame, a fence gate, etc., and the type of the access door is not limited in this embodiment. In one example, the access door includes a door frame in the working area.

In one example, the image identification model is stored in the self-moving device. The environment image is input into the image identification model by the self-moving device, and the object identification result is obtained. The object identification result includes attribute information of a target object. When the object identification result includes access door information, it is determined that the environment image includes an image of the access door. When the object identification result does not include the access door information, it is determined that the environment image does not include the image of the access door. The target object includes an access door.

The image identification model is obtained by training with sample environment images and sample object results based on a small network model.

Alternatively, in order to reduce the hardware requirements of the self-moving device in the image identification process, the computing resources occupied by the image identification model when running are lower than the maximum computing resources provided by the self-moving device. The image identification model is trained using training data based on a small network model. The training data includes training images of various objects in the working area of the self-moving device and the identification result of each training image. The small network model refers to a network model in which the number of model layers is less than the first value; and/or, the number of nodes in each layer is less than the second value. Wherein, the first value and the second value are both smaller integers. For example, the small network detection model is a miniature YOLO model a MobileNet model. Of course, the small network detection model may also be other models, which will not be listed one by one here in this embodiment.

Alternatively, in order to further compress the computing resources occupied during the operation of the image identification model, after the image identification model is obtained by training, the self-moving device can also perform model compression processing on the image identification model. The model compression processing includes, but is not limited to: model tailoring, model quantization and/or low-rank decomposition.

The object identification result includes attribute information of the target object, such as: the type of the object, the size of the object, and the position information of the object in the environment image. In addition to the access door, the target object may also include household items such as a bed, a table, and a sofa, and the type of the target object is not limited in this embodiment.

Alternatively, obtaining the position information of the access door in the working area includes: obtaining a first distance between the access door and the self-moving device in the environment image output by the image identification model; obtaining a second distance between the time when the environment image is captured and the boundary indicated by the edge information; and obtaining the position information of the access door according to the position of the access door relative to the boundary indicated by the edge information, which is determined according to the first distance and the second distance. Alternatively, a positioning component is installed on the self-moving device, the self-moving device obtains a first distance between the access door in the environment image output by the image identification model and the self-moving device; obtains positioning information acquired by the positioning component when the environment image is collected; and obtains the position information of the access door according to the first distance and the positioning information. Of course, the manner of obtaining the position information of the access door by the self-moving device may also be other manners, which are not listed one by one in this embodiment.

Step 1304, dividing independent areas within the working area based on the access door information and the edge information.

Because one or more independent areas in the working area may not be completely closed, but communicate with other areas in the working area, such as areas like open kitchens. At this time, the independent area cannot be distinguished from other areas only based on the edge information from the self-moving device. Based on this, in this embodiment, by combining the edge information with the access door information, an open independent area can be determined, thereby improving the accuracy of area division.

Dividing the independent areas in the working area based on the access door information and the edge information, includes: obtaining the position information of the corresponding access door in the working area indicated by the access door information; combining the edge information and the position information to obtain a combined boundary information; and divide each closed area formed by the combined boundary information into corresponding independent areas.

The edge information is obtained from the self-moving device driving along the edge.

For example, the self-moving device is a sweeper which obtains the edge information of the house after cleaning the entire house of a user. Afterwards, the environment images collected during the cleaning process are captured, and each environment image is identified. The position information of the access door is obtained when the environment image includes an image of the access door. By combining the position information with the edge information, multiple closed graphics can be obtained, and each closed graphics corresponds to an independent area.

In summary, by obtaining the edge information of the working area where the self-moving device is located; by obtaining the environment image collected during movement; by obtaining the access door information based on the environment image; and by dividing the independent areas in the working area based on the access door information and the edge information, the control method provided by this embodiment from the self-moving device can solve the problem that the existing technology cannot realize the division of the working area, and realize the division of working areas, so as to achieve the effect of individualized work according to the divided independent areas. In addition, since the access door can be an open virtual door, the information of the virtual door and the edge information can be combined to obtain the area boundary of each independent area, so as to divide the corresponding independent area, which can realize the area division of the open door scene and improve the accuracy of area division.

In addition, by processing model compression on the image identification model to obtain the image identification model for identifying the access door, it can further reduce the computing resources occupied by the image identification model when running, thereby improving the identification speed, and reducing the hardware requirements of self-moving devices.

Figure 14:
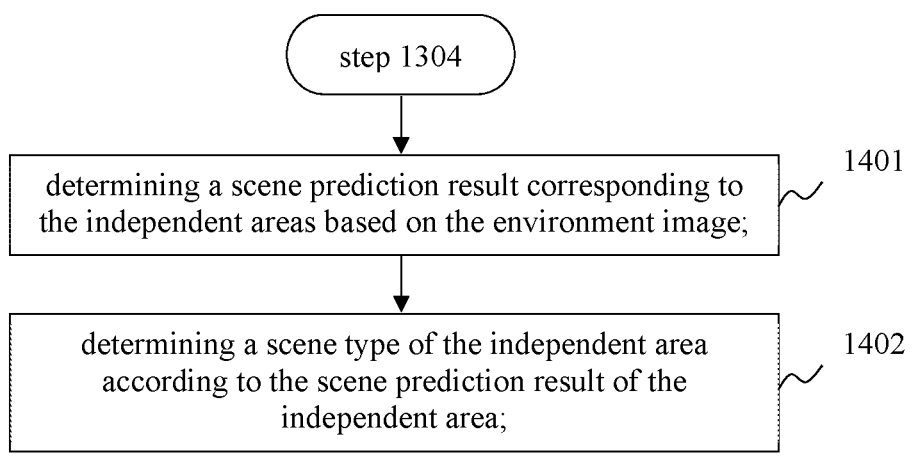
FIG. 14 is a flowchart of a control method of a self-moving device provided by another embodiment of the present disclosure.

Alternatively, after obtaining multiple independent areas in the working area, the self-moving device may also identify a scene type of each independent area. At this time, after the step 1304, referring to FIG. 14, the control method of the self-moving device further includes the following steps:

Step 1401, determining a scene prediction result corresponding to the independent areas based on the environment image.

The scene prediction result is used to indicate the scene type predicted from the self-moving device based on the relevant information of the single independent area. The scene prediction result can be one or more scene types.

The scene type is used to indicate the type of working environment in which the self-moving device is currently located. The dividing method of the scene type is set according to the working environment of the self-moving device. For example, if the working environment of the self-moving device is a room, the scene type includes: bedroom type, kitchen type, study room type, bathroom type, etc. The present embodiment does not limit the division manner of the scene type.

In one example, determining the scene prediction result corresponding to the independent areas based on the environment image, includes: obtaining an image identification model, computing resources occupied by the image identification model during operation being lower than maximum computing resources provided by the self-moving device; for each independent area, inputting the environment image corresponding to the independent area into the image identification model to obtain an object identification result, the object identification result including attribute information of a target object; obtaining a scene identification model, the scene identification model being obtained by training with sample attribute information and a sample scene type of an object; and inputting the object identification result into the scene identification model to obtain the scene prediction result, the scene prediction result including at least one predicted scene type of the independent area.

The relevant description of the image identification model can be referred to the step 1303, which is not repeated here in this embodiment.

The scene identification model is obtained by training with the sample attribute information and the sample scene type of the object.

Alternatively, the scene prediction result output by the scene identification model includes multiple scene types. At this time, the scene identification model will also output a confidence level corresponding to each scene type. The confidence level is used to indicate how accurate each scene type is output.

Step 1402, determining a scene type of the independent area according to the scene prediction result of the independent area.

In one embodiment, determining the scene type of the independent area according to the scene prediction result of the independent areas, includes: obtaining pose information of each independent area; and combining a scene area result of each independent area with the pose information of each independent area, and determining the scene type of each independent area according to a preset probability distribution strategy; wherein the probability distribution strategy is used for each target scene type, and it is determined from each independent area that the scene type is the independent area with a highest probability of the target scene type.

The pose information includes position information and orientation information of a corresponding independent area in the working area. The orientation information may be the direction of the access door in the corresponding independent area.

When determining the scene type of the independent area, the self-moving device can determine the scene type of each independent area according to the scene prediction results of the multiple independent areas according to the preset probability distribution strategy.

Illustratively, the probability distribution strategy is: there is corresponding template pose information for each scene type. The pose information of the independent area is compared with the template pose information of each scene type, and the pose comparison result is obtained. For each target scene type, the probability result is obtained by multiplying the scene prediction result and the pose comparison result corresponding to the target scene type with the corresponding weight. The type of the independent area with the highest probability result is determined as the scene type.

Figure 15:
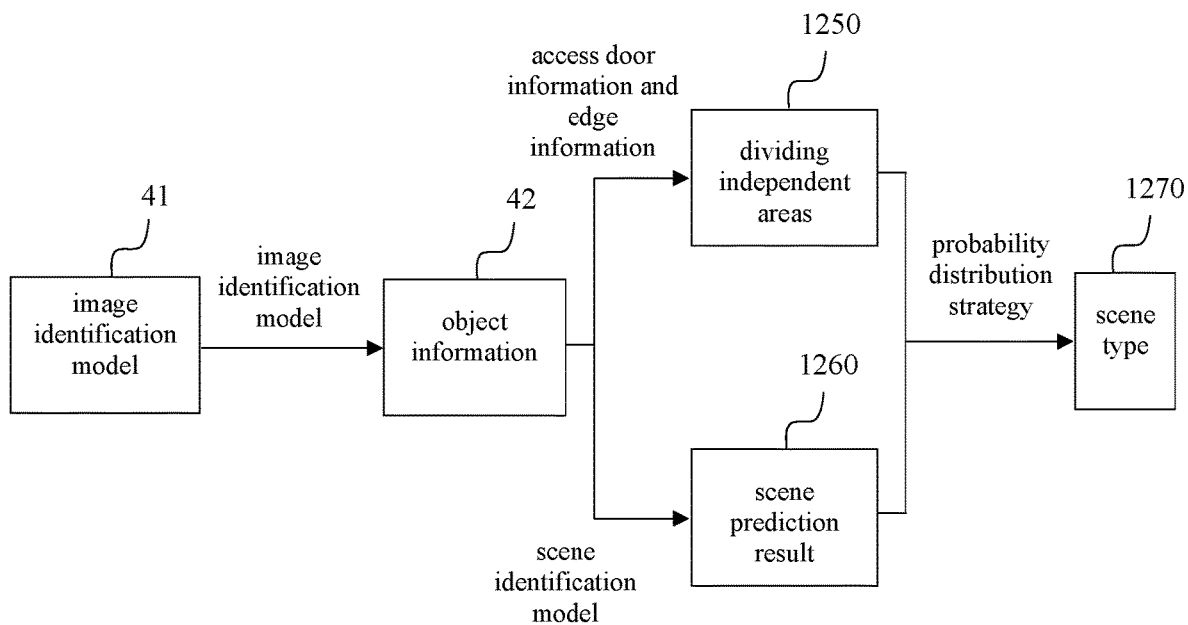
FIG. 15 is a schematic diagram of a control of a self-moving device provided by an embodiment of the present disclosure.

In order to more clearly understand the control method of the self-moving device provided by the present disclosure, an example of the method will be described below. Referring to FIG. 15, the edge information in the working area is obtained after the self-moving device completes the work in the working area. The environment images collected by the image collecting component during the working process are input into the image identification model 41 to obtain the object information 42. Combining the access door information and the edge information in the object information 42 to divide the working area, a plurality of independent areas 1250 are obtained. After inputting the object information into the scene identification model, a scene prediction result 1260 for each independent area is obtained. Combining the scene prediction results 1260 of the multiple independent areas, the scene type 1270 of each independent area is obtained based on the probability distribution strategy.

In summary, by determining the scene prediction result corresponding to the independent area based on the environment image; and determining the scene type of the independent area according to the scene prediction result of the independent area, the control method for the self-moving device provided by this embodiment can enable the self-moving device to identify the scene type of each independent area in the entire working area, provide users with more information, and make the self-moving device more intelligent.

Ninth Embodiment

Figure 16:
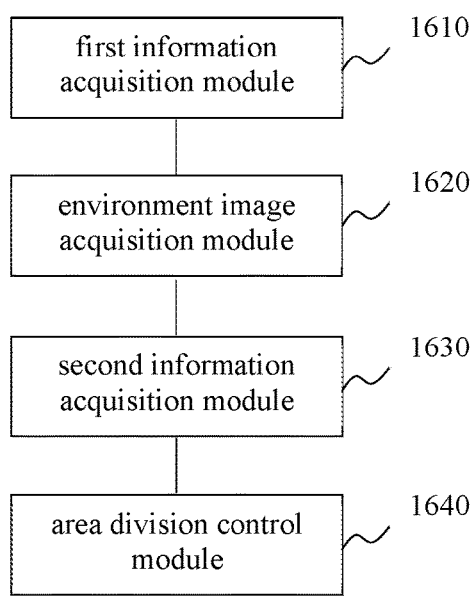
FIG. 16 is a block diagram of a control device of a self-moving device provided by an embodiment of the present disclosure.

FIG. 16 is a block diagram of a control device for a self-moving device provided by an embodiment of the present disclosure. This embodiment is described by taking the device applied to the control component 1210 in the control system of the self-moving device shown in FIG. 12 as an example. The device includes at least the following modules: a first information acquisition module 1610, an environment image acquisition module 1620, a second information acquisition module 1630 and an area division control module 1640.

The first information acquisition module 1610 is configured to obtain edge information of a working area where the self-moving device is located.

The environment image acquisition module 1620 is configured to obtain an environment image captured while moving.

The second information acquisition module 1630 is configured to obtain access door information based on the environment image.

The area division control module 1640 is configured to divide independent areas within the working area based on the access door information and the edge information.

For related details, refer to the above method embodiment.

It should be noted that, when the control device of the self-moving device provided in the above embodiment performs the control of the self-moving device, only the division of the above-mentioned functional modules is used for illustration. In practical applications, the above-mentioned functions can be allocated by different functional modules as required. That is, the internal structure of the control device of the self-moving device is divided into different functional modules in order to complete all or part of the functions described above. In addition, the control device of the self-moving device provided in the above-mentioned embodiment belongs to the same concept as the embodiment of the control method of the self-moving device. For the specific implementation process, please refer to the method embodiment, which will not be repeated here.

Tenth Embodiment

Figure 17:
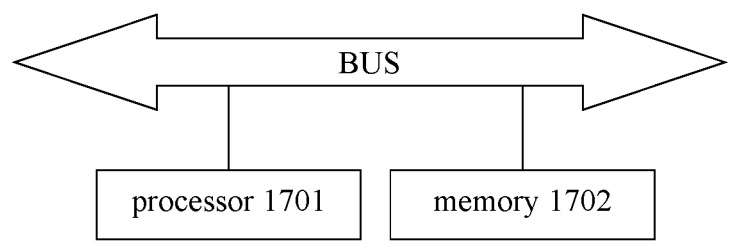
FIG. 17 is a block diagram of a control device of a self-moving device provided by an embodiment of the present disclosure.

FIG. 17 is a block diagram of a control device of a self-moving device provided by an embodiment of the present disclosure. The control device may be a self-moving device as shown in FIG. 1, FIG. 8 or FIG. 12. Of course, the control device can also be other devices that are installed on the self-moving device and independent of the self-moving device. The control device at least includes a processor 1701 and a memory 1702.

The processor 1701 may include one or more processing cores, such as a 4-core processor, an 8-core processor, and so on. The processor 1701 may adopt at least one hardware form among DSP (Digital Signal Processing), FPGA (Field-Programmable Gate Array), and PLA (Programmable Logic Array). The processor 1701 may also include a main processor and a coprocessor. The main processor is a processor used to process data in an awake state, and is also called a CPU (Central Processing Unit). The coprocessor is a low-power processor used to process data in a standby state. In some embodiments, the processor 1701 may further include an AI (Artificial Intelligence) processor. The AI processor is used to process computing operations related to machine learning.

The memory 1702 may include one or more computer-readable storage media. The computer-readable storage medium may be non-transitory. The memory 1702 may also include high-speed random access memory and non-volatile memory, such as one or more magnetic disk storage devices and flash memory storage devices. In some embodiments, a non-transitory computer-readable storage medium in the memory 1702 is used to store at least one instruction. The at least one instruction is used to be executed by the processor 1701 to implement the control methods of the self-moving device provided in the embodiments of the present disclosure.

In some embodiments, alternatively, the control device of the self-moving device may further include a peripheral device port and at least one peripheral device. The processor 1701, the memory 1702 and the peripheral device port may be connected through a BUS or a signal line. Each peripheral device can be connected to the peripheral device port through a BUS, a signal line or a circuit board. Illustratively, the peripheral devices include, but are not limited to, radio frequency circuits, touch screens, audio circuits and power supplies etc.

Of course, the control device of the self-moving device may also include fewer or more components, which is not limited in this embodiment.

Alternatively, the present disclosure also provides a computer-readable storage medium. The computer-readable storage medium stores a program. The program is loaded and executed by the processor to implement the control method of the self-moving device in the above method embodiment.

Alternatively, the present disclosure also provides a computer product. The computer product includes a computer-readable storage medium. The computer-readable storage medium stores a program. The program is loaded and executed by the processor to implement the control method of the self-moving device in the above method embodiment.

In the case of no conflict, the technical features of the above-mentioned embodiments can be combined arbitrarily. In order to make the description concise, all possible combinations of the various technical features in the above embodiments are not described. However, as long as there is no contradiction in the combination of these technical features, it should be regarded as the scope described in this specification.

The above embodiments only express several implementation manners of the present disclosure, and the description is relatively specific and detailed, but it should not be understood as a limitation on the scope of the present disclosure. It should be pointed out that for those of ordinary skill in the art, without departing from the concept of the present disclosure, several modifications and improvements can be made, and these all fall within the protection scope of the present disclosure. Therefore, the protection scope of the present disclosure should be subject to the appended claims.

What is claimed is:

1. A control method for a self-moving device, comprising:
obtaining edge information of a working area where the self-moving device is located;
obtaining an environment image captured while moving;
obtaining access door information based on the environment image; and dividing independent areas within the working area based on the access door information and the edge information,
wherein the obtaining the access door information based on the environment image comprises:
inputting the environment image into an image identification model to obtain an object identification result; the object identification result comprising attribute information of a target object; computing resources occupied by the image identification model during operation being lower than maximum computing resources provided by the self-moving device, and
when the object identification result comprises access door information, determining that the environment image comprises an image of the access door, and obtaining position information of the access door in the working area.

2. The method according to claim 1, wherein after the dividing the independent areas within the working area based on the access door information and the edge information, the method further comprises:
determining a scene prediction result corresponding to the independent areas based on the environment image; and
determining a scene type of the independent area according to the scene prediction result of the independent area.

3. The method according to claim 2, wherein the dividing the independent areas within the working area based on the access door information and the edge information, comprises:
obtaining position information of a corresponding access door in the working area indicated by the access door information;
combining the edge information and the position information to obtain combined boundary information; and
dividing each closed area formed by the combined boundary information into corresponding independent areas.

4. The method according to claim 1, wherein the obtaining the access door information based on the environment image, comprises:
identifying whether the environment image comprises an image of an access door; and
obtaining position information of the access door in the working area when the environment image comprises the image of the access door.

5. The method according to claim 4, wherein the access door comprises a door frame in the working area.

6. The method according to claim 2, wherein the determining the scene type of the independent area according to the scene prediction result of the independent areas, comprises:
obtaining pose information of each independent area, the pose information comprising position information and orientation information of a corresponding independent area in the working area; and
combining a scene area result of each independent area with the pose information of each independent area, and determining the scene type of each independent area according to a preset probability distribution strategy;
wherein the probability distribution strategy is used for each target scene type, and it is determined from each independent area that the scene type is the independent area with a highest probability of the target scene type.

7. The method according to claim 2, wherein the determining the scene prediction result corresponding to the independent areas based on the environment image, comprises:
obtaining an image identification model, computing resources occupied by the image identification model during operation being lower than maximum computing resources provided by the self-moving device;
for each independent area, inputting the environment image corresponding to the independent area into the image identification model to obtain an object identification result, the object identification result comprising attribute information of a target object;
obtaining a scene identification model, the scene identification model being obtained by training with sample attribute information and a sample scene type of an object; and
inputting the object identification result into the scene identification model to obtain the scene prediction result, the scene prediction result comprising at least one predicted scene type of the independent area.

8. The method according to claim 7, wherein the image identification model is obtained by training with sample environment images and sample object results based on a small network model.

9. The method according to claim 7, wherein the scene identification model is obtained by training with the sample attribute information and the sample scene type of the object.

10. A control device for a self-moving device, comprising:
at least one processors configured to:
obtain edge information of a working area where the self-moving device is located;
obtain an environment image captured while moving;
obtain access door information based on the environment image; and
divide independent areas within the working area based on the access door information and the edge information, wherein the obtaining the access door information based on the environment image comprises:
inputting the environment image into an image identification model to obtain an object identification result; the object identification result comprising attribute information of a target object; computing resources occupied by the image identification model during operation being lower than maximum computing resources provided by the self-moving device, and
when the object identification result comprises access door information, determining that the environment image comprises an image of the access door, and obtaining position information of the access door in the working area.

11. The control device of the self-moving device according to claim 10, wherein the control device further comprises a non-transitory memory and a program is stored in the non-transitory memory, the program is loaded by the at least one processors and executed to realize a control method of the self-moving device, the control method comprising:
obtaining the edge information of the working area where the self-moving device is located;
obtaining the environment image captured while moving;
obtaining the access door information based on the environment image; and
dividing the independent areas within the working area based on the access door information and the edge information.

12. A self-moving device, comprising:
a wheel for driving movement of the self-moving device;
a motor for driving movement of the movement component;
a camera installed on the self-moving device and adapted to acquire an environment image in a moving direction of the self-moving device; and
a processor communicatively connected with the motor and the camera, the processor being communicatively connected with a non-transitory memory, a program being stored in the non-transitory memory, the program being loaded by the processor and executed to realize a control method of the self-moving device, the control method comprising:
obtaining edge information of a working area where the self-moving device is located;
obtaining the environment image captured while moving;
obtaining access door information based on the environment image; and
dividing independent areas within the working area based on the access door information and the edge information,
wherein the obtaining the access door information based on the environment image, comprises:
inputting the environment image into an image identification model to obtain an object identification result; the object identification result comprising attribute information of a target object; computing resources occupied by the image identification model during operation being lower than maximum computing resources provided by the self-moving device, and
when the object identification result comprises access door information, determining that the environment image comprises an image of the access door, and obtaining position information of the access door in the working area.

13. The method according to claim 1, wherein the method comprises obtaining the environment image captured by an image identification component while moving; the access door information refers to access door information in each independent area, and the access door comprises a door frame in the working area.

14. The method according to claim 1, wherein the edge information is path information obtained by traveling along an edge during a movement of the self-moving device; the environment image is read by the self-moving device after work on the working area is completed;
wherein dividing the independent areas within the working area based on the access door information and the edge information, comprises:
combining the edge information and the position information to obtain combined boundary information, the combined boundary information comprising a plurality of closed graphics, each closed graphic corresponding to one independent area; and
dividing each closed area formed by the combined boundary information into corresponding independent areas.

15. The method according to claim 1, wherein the obtaining position information of the access door in the working area based on the environment image, comprises:
obtaining a first distance between the access door and the self-moving device in the environment image output by the image identification model; obtaining a second distance between the time when the environment image is captured and a boundary indicated by the edge information; and determining a position of the access door relative to the boundary indicated by the edge information according to the first distance and the second distance so as to obtain the position information of the access door;
or, a positioning sensor being installed on the self-moving device, the self-moving device obtaining a first distance between the access door in the environment image output by the image identification model and the self-moving device; obtaining positioning information acquired by the positioning sensor when the environment image is collected; and obtaining the position information of the access door according to the first distance and the positioning information;
dividing the independent areas within the working area based on the access door information and the edge information.

16. The method according to claim 2, wherein the determining the scene type of the independent area according to the scene prediction result of the independent areas, comprises:
obtaining pose information of each independent area, the pose information comprising position information and orientation information of a corresponding independent area in the working area; and
combining a scene area result of each independent area with the pose information of each independent area, and determining the scene type of each independent area according to a preset probability distribution strategy;
wherein the probability distribution strategy is used for each target scene type, and it is determined from each independent area that the scene type is the independent area with a highest probability of the target scene type.

17. The method according to claim 16, wherein the probability distribution strategy comprises that:
there is corresponding template pose information for each scene type, and the pose information of the independent area is compared with the template pose information of each scene type so as to obtain a pose comparison result;
for each target scene type, a probability result is obtained by multiplying a scene prediction result and the pose comparison result corresponding to the target scene type with a corresponding weight; and
a type of the independent area with a highest probability result is determined as the scene type.

18. The method according to claim 6, wherein the probability distribution strategy comprises that:
there is corresponding template pose information for each scene type, and the pose information of the independent area is compared with the template pose information of each scene type so as to obtain a pose comparison result;
for each target scene type, a probability result is obtained by multiplying a scene prediction result and the pose comparison result corresponding to the target scene type with a corresponding weight; and
a type of the independent area with a highest probability result is determined as the scene type.

19. The self-moving device according to claim 12, further comprising a computer-readable storage media, a program being stored in the computer-readable storage medium, the program being executed by a processor to implement the control method of the self-moving device.

* * * * *